Patented Apr. 11, 1950

2,503,709

UNITED STATES PATENT OFFICE 2,503,709

POLYMETHINE DYES CONTAINING A TRIAZOLE NUCLEUS

Leslie G. S. Brooker and Robert H. Sprague, Rochester, N. Y., assignors to Eastman Kodak Company, Rochester, N. Y., a corporation of New Jersey No Drawing. Application December 19, 1947, Serial No. 792,838

19 Claims. (Cl. 260—240)

This invention relates to polymethine dyes containing a triazole nucleus and to a process for the preparation thereof.

The dyes of this invention can be represented by the following general formula:

I. 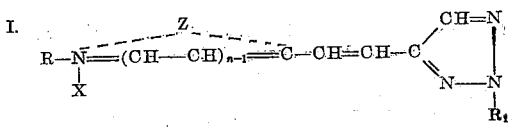

wherein R represents an alkyl group (i. e. an alcohol radical), e. g. methyl, ethyl, n-propyl, n-butyl, isobutyl, n-amyl, isoamyl, β-hydroxyethyl, γ-hydroxypropyl, β-methoxyethyl, β-ethoxyethyl, allyl, benzyl (phenylmethyl), β-phenylethyl, β-carboxyethyl, carboxymethyl, α-carboxyethyl, γ-carboxypropyl, β-acetoxyethyl, γ-acetoxypropyl, carbmethoxymethyl, carbethoxymethyl, carbmethoxymethyl, β-carbmethoxyethyl, carbethoxymethyl, β-carbethoxyethyl, etc., $R_1$ represents an aryl group, e. g. phenyl, p-chlorophenyl, p-methoxyphenyl, etc., n represents a positive integer of from 1 to 2, X represents an anion, e. g. chloride, bromide, iodide, benzenesulfonate, p-toluenesulfonate, methylsulfate, ethylsulfate, perchlorate, acetate, propionate, thiocyanate, sulfamate, etc. and Z represents the non-metallic atoms necessary to complete a heterocyclic nucleus selected from the group consisting of heterocyclic nuclei containing from 5 to 6 members in the heterocyclic ring, e. g. heterocyclic nuclei of the oxazole series (e. g. 4-methyloxazole, 4-phenyloxazole, 5-methyloxazole, 4,5-diphenyloxazole, 4-ethyloxazole, 4,5-dimethyloxazole, 5-phenyloxazole, etc.), heterocyclic nuclei of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 6-methoxybenzoxazole, 5 - methoxybenzoxazole etc.), heterocyclic nuclei of the naphthoxazole series (e. g. α-naphthoxazole, β-naphthoxazole, etc.), heterocyclic nuclei of the thiazole series (e. g. thiazole, 4-phenylthiazole, 4-methylthiazole, 4,5-diphenylthiazole, 5-methylthiazole, 5-phenylthiazole, 4,5-dimethylthiazole, 4-(2-thienyl)thiazole, etc.), heterocyclic nuclei of the benzothiazole series (e. g. benzothiazole, 4-phenylbenzothiazole, 5-phenylbenzothiazole, 4,6-dibromobenzothiazole, 4-methylbenzothiazole, 5-methylbenzothiazole, 5-methoxybenzothiazole, 5-ethoxybenzothiazole, 6-methylbenzothiazole, 6-methoxybenzothiazole, 6-ethoxybenzothiazole, 5-chlorobenzothiazole, 4-ethoxybenzothiazole, 6-chlorobenzothiazole, 5,6-dioxymethylenebenzothiazole, tetrahydrobenzothiazole, 5,6-cyclohexylidenedioxymethylenebenzothiazole, 5,6 - cyclopentylidenedioxymethylenebenzothiazole, etc.), heterocyclic nuclei of the naphthothiazole series (e. g. α - naphthothiazole, β - naphthothiazole, etc.), heterocyclic nuclei of the selenazole series (e. g. selenazole, 4-methylsenenazole, 4-phenylselenazole, etc.), heterocyclic nuclei of the benzoselenazole series (e. g. benzoselenazole, 5-chlorobenzoselenazole, etc.), heterocyclic nuclei of the naphthoselenazole series (e. g. α-naphthoselenazole, β-naphthoselenazole, etc.), heterocyclic nuclei of the thiazoline series, e. g. thiazoline, 5-methylthiazoline, etc.), heterocyclic nuclei of the selenazoline series (e. g. selenazoline, etc.), heterocyclic nuclei of the 3,3-dimethylindolenine series (e. g. 3,3-dimethylindolenine, 3,3,5-trimethylindolenine, 3,3,7 - trimethylindolenine, etc.), heterocyclic nuclei of the quinoline series (e. g. quinoline, 6-methylquinoline, 5-methylquinoline, 7-methylquinoline, 8-methylquinoline, 6-chloroquinoline, 8-chloroquinoline, 5-ethoxyquinoline, 6-ethoxyquinoline, 7-ethoxyquinoline, etc.), heterocyclic nuclei of the isoquinoline series, heterocyclic nuclei of the pyridine series, etc., and R represents an aryl group, e. g. phenyl when Z represents the non-metallic atoms necessary to complete a heterocyclic nucleus selected from thiazole, thiazoline, benzothiazole and 3,3-dimethylindolenine nuclei.

In accordance with our invention, we prepare our new dyes represented by the above Formula I by condensing a 4-formyl-2-aryl-2,1,3-triazole with a cyclammonium quaternary salt containing a reactive methyl group, i. e. a methyl group in the α- or γ-position, in the presence of a water-binding agent. Carboxylic anhydrides, e. g. acetic, propionic or butyric anhydrides are advantageously employed as water-binding agents.

The cyclammonium quaternary salts containing a reactive methyl group can be represented by the following general formula:

II. 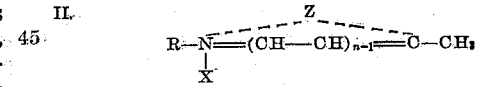

wherein R, n, X and Z have the values given above. Typical of these quaternary salts are: 2,4-dimethyloxazole ethiodide, 4,5-diphenyloxazole n-propiodide, 2-methylbenzoxazole ethiodide, 2-methyl-5-chlorobenzoxazole ethiodide, 5-phenylbenzoxazole etho-p-toluenesulfonate, 2-methyl-α-naphthoxazole ethiodide, 2-methyl-β-naphthoxazole ethiodide, 2,4-dimethylthiazole ethiodide, 2-methyl-4,5-diphenylthiazole ethiodide, benzothiazole ethiodide, 5-chlorobenzothiazole ethiodide, 4-phenylbenzothiazole ethiodide, benzothiazole carboxymethobromide, 5-phenylbenzothiazole ethiodide, 2-methyl-α-naphthothiazole metho-p-toluenesulfonate, 2-methyl-β-naphthothiazole etho-p-toluenesulfonate, 2-methylbenzoselenazole ethiodide, 5-chloro-2-methylbenzoselenazole ethiodide, tetrahydrobenzoselenazole ethiodide, 2-methyl-5,6-cyclohexylidenedioxybenzothiazole etho-p-toluenesulfonate, 2-methylbenzothiazole β-ethylethobromide, 2-methylbenzothiazole alloiodide, lepidine n-butiodide, quinaldine ethiodide, 6-ethoxy-2-methylquinoline ethiodide, α-picoline methiodide, 2-methylthiazoline methiodide, 1-methylisoquinoline methiodide, 3-methylisoquinoline ethoethylsulfate, etc.

The 4-formyl-2-aryl-2,1,3-triazoles can be prepared by the method of Hann and Hudson, Jour. Am. Chem. Soc. 66, 735 (1944).

The following examples will serve to illustrate further the manner of practicing our invention.

*Example 1.—1-ethyl-3,3-dimethyl - 2' - phenylpseudoindolo-2,1,3-triazolocarbocyanine iodide*

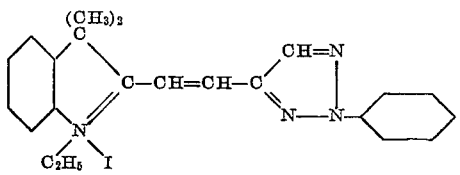

1.7 g. (1 mol.) of 4 - formyl-2 - phenyl - 2,1,3-triazole, 3.15 g. (1 mol.) of 2,3,3-trimethylindolenine ethiodide and 25 cc. of acetic anhydride were boiled together under reflux for 10 minutes. The orange reaction mixture was cooled, diluted with 200 cc. of ether and the ether solution decanted from the sticky precipitate. The dye was stirred with 15 cc. of acetone until crystals separated and chilled to 0° C. The product was collected on a filter, washed on the filter with acetone and water and dried.

The yield of red crystals was 3.5 g., 74 per cent. After recrystallization from methyl alcohol (10 cc./gram of dye) the dye was obtained as heavy red crystals with a blue reflex. The dye melted with decomposition at 213–214° C. Yield 2.8 g., 59%.

*Example 2.—3 - ethyl - 2' - phenylthia-2,1,3-triazolocarbocyanine iodide*

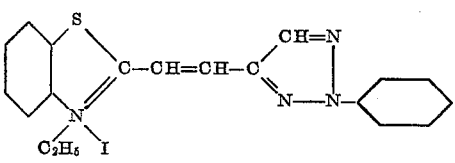

3.05 g. (1 mol.) of 2 - methylbenzothiazole ethiodide, 1.73 g. (1 mol.) of 4-formyl-2-phenyl-2,1,3-triazole and 25 cc. of acetic anhydride were boiled together under reflux for 10 minutes. The dye was precipitated from the cooled solution by addition of 200 cc. of ether. The ether solution was decanted off and the sticky residue was stirred with 15 cc. of acetone until crystals separated. The solution was chilled to 0° C. and the dye filtered with suction. The dye was washed on the filter with acetone and water and dried. The yield of brown crystals was 1.6 g., 35 per cent. After recrystallization from methyl alcohol (80 cc. per gram of dye) the dye was obtained as orange crystals melting with decomposition at 225–227° C. Yield 1.1 g., 24 per cent.

*Example 3.—1' - ethyl - 6' - methyl - 2 - phenyl-2,1,3-triazolo-2'-carbocyanine iodide*

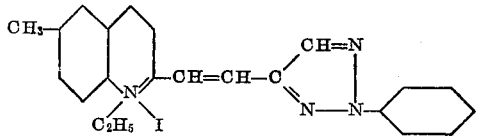

10.4 g. (1 mol.) of 2,6 - dimethylquinoline ethiodide, 5.76 g. (1 mol.) of 4-formyl-2-phenyl-2,1,3-triazole and 50 cc. of acetic anhydride were boiled together under reflux for 10 minutes. Crystals of dye separated out of the boiling solution. The mixture was chilled to 0° C., the dye collected on a filter and washed on the filter with acetone and water. The yield of yellow crystals was 7.3 g., 47 per cent. After recrystallization from methyl alcohol (185 cc. per gram of dye) the dye was obtained as pale yellow needles which melted with decomposition at 258–259° C. Yield 5.4 g., 35 per cent.

*Example 4.—1' - ethyl - 2 - phenyl-2,1,3-triazolo-4'-carbocyanine iodide*

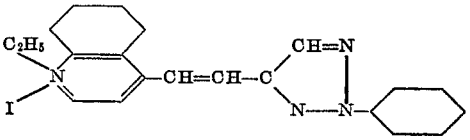

1.73 g. (1 mol.) of 4-formyl-2-phenyl-2,1,3-triazole, 3.0 g. (1 mol.) of lepidine ethiodide and 25 cc. of acetic anhydride were heated together at the refluxing temperature for 10 minutes. The cool reaction mixture was stirred with diethyl ether. The ether-acetic anhydride layer was decanted and the sticky residue was stirred with acetone. The acetone layer was decanted and the mass became crystalline when it was stirred with water. The yield of dye was 7 per cent crude and 3 per cent after two recrystallizations from methyl alcohol. The brown crystals had melting point 228–229° C. with decomposition, and their methyl alcoholic solution was yellow.

*Example 5.—3,3 - dimethyl-1,2'-diphenylpseudoindolo-2,1,3-triazolocarbocyanine perchlorate*

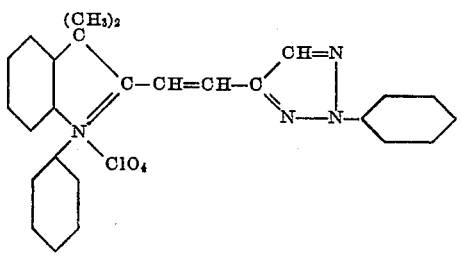

1.73 g. (1 mol.) of 4-formyl-2-phenyl-2,1,3-triazole, 3.4 g. (1 mol.) of 2,3,3-trimethylindolenine phenoperchlorate and 25 cc. of anhydrous ethyl alcohol containing 3 drops of piperidine were heated together at the refluxing temperature for 30 minutes. After chilling, the solid was collected on a filter and washed with water. The yield of dye was 78 per cent crude and 37 per cent after two recrystallizations from methyl alcohol. The brown needles with a silver reflex had melting point 208–209° C. with decomposition and their methyl alcoholic solution was yellow.

*Example 6.—3-ethyl-2'-phenyl - 4,5-benzothia-2',1',3' - triazolocarbocyanine p - toluenesulfonate*

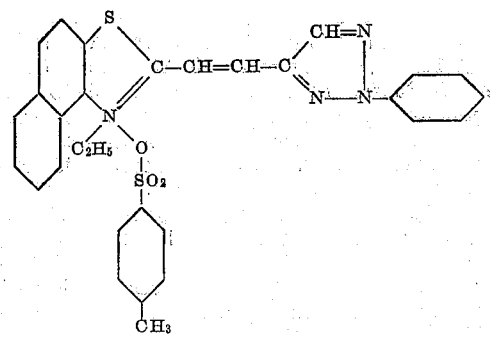

1.73 g. (1 mol.) of 4-formyl-2-phenyl-2,1,3-triazole, 4.0 g. (1 mol.) of 2-methyl-β-naphthothiazole etho-p-toluenesulfonate and 25 cc. of acetic anhydride were heated together at the refluxing temperature for 45 minutes. After chilling, the solid was collected on a filter and washed first with acetone and then water. The yield of dye was 36 per cent crude and 20 per cent after two recrystallizations from methyl alcohol. The pale yellow needles had melting point 183–185° C. with decomposition and their methyl alcoholic solution was almost colorless.

*Example 7.—1'-ethyl-2-phenyl-2,1,3-triazolo-2'-carbocyanine iodide*

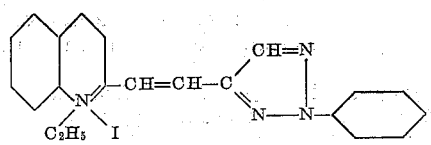

1.73 g. (1 mol.) of 4-formyl-2-phenyl-2,1,3-triazole, 3.0 g. (1 mol.) of quinaldine ethiodide and 25 cc. of acetic anhydride were heated together at the refluxing temperature for 30 minutes. After chilling, the solid was collected on a filter and washed first with acetone and then water. The yield of dye was 60 per cent crude and 22 per cent after two recrystallizations from methyl alcohol. The yellow crystals had melting point 244–245° C. with decomposition and their alcoholic solution was pale yellow with a greenish fluorescence.

*Example 8.—1-ethyl-2'-phenyl-2-pyrido-2',1',3-triazolocarbocyanine iodide*

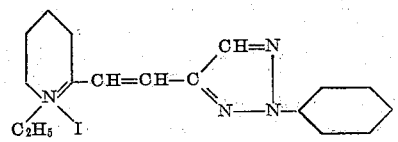

1.73 g. (1 mol.) of 4-formyl-2-phenyl-2,1,3-triazole, 2.5 g. (1 mol.) of α-picoline ethiodide and 25 cc. of acetic anhydride were heated together at the refluxing temperature for 30 minutes. After chilling, the solid was collected on a filter and washed first with acetone and then water. The yield of dye was 25 per cent crude and 15 per cent after two recrystallizations from methyl alcohol. The pale yellow crystals had melting point 216–217° C. with decomposition and their methyl alcoholic solution was almost colorless.

*Example 9.—2-ethyl-2' - phenyl - 3 - isoquino-2',1',3'-triazolocarbocyanine iodide*

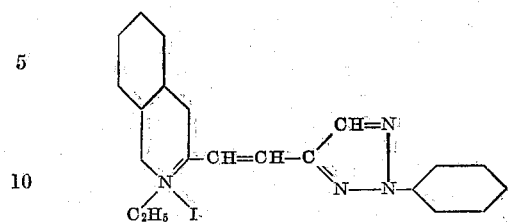

2.6 g. (1 mol.+50% excess) of 4-formyl-2-phenyl-2,1,3-triazole, 3.0 g. (1 mol.) of 3-methyl-isoquinoline ethiodide and 5 cc. of piperidine were heated together in a test tube, at the boiling point for about 5 minutes. The sticky brown mass was stirred with several successive portions of diethyl ether. The mass became crystalline when it was stirred with acetone. After chilling, the solid was collected on a filter and washed first with acetone and then water. The yield of dye was 4 per cent crude and 1 per cent after two recrystallizations from methyl alcohol. The nearly colorless crystals had melting point 247–248° C. with decomposition.

*Example 10.—1'-ethyl-6'-methyl-2-phenyl-2,1,3-triazolocarbocyanine chloride*

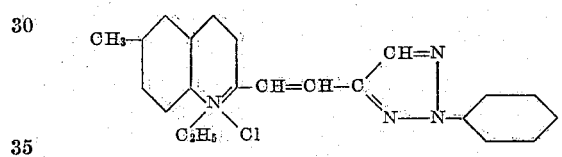

To a suspension of 9.0 g. (1 mol.) of 1'-ethyl-6'-methyl-2-phenyl-2,1,3-triazolo - 2'-carbocyanine iodide in 600 cc. of methyl alcohol was added, an excess of freshly prepared silver chloride, which was made by adding an excess of C. P. hydrochloric acid to an aqueous solution of silver nitrate. Before using the silver chloride, it was first thoroughly washed with distilled water and then a small amount of alcohol. The suspension of the dye and silver halide in methyl alcohol was heated, with mechanical stirring, for 4 hours at the refluxing temperature. The silver halides were removed by filtration. The filtrate was concentrated and 25 cc. of acetone was added. The dye separated on cooling. The dye chloride weighed 6.2 g. crude and 5.2 g. after one recrystallization from ethyl alcohol. The yellow crystals had melting point 222–225° C. with decomposition.

In the manner illustrated in the foregoing examples any of the cyclammonium quaternary salts of Formula II can be condensed with 4-formyl-2-phenyl-2,1,3-triazole, in acetic anhydride, to give dyes of Formula I. Thus 2-methylbenzothiazole pheniodide gives 3,2'-diphenylthia-2,1,3-triazolocarbocyanine iodide, lepidine n-butiodide gives 1'-n-butyl-2-phenyl-2,1,3-triazolo-4'-carbocyanine iodide, 2-methyl-α-naphthothiazole etho-p-toluenesulfonate gives 1-ethyl-2'-phenyl-6,7-benzothia-2,1,3-triazolocarbocyanine p-toluenesulfonate, 2-methylthiazoline methiodide gives 3-methyl-2'-thiazolino-2,1,3-triazolocarbocyanine iodide, 2,4-dimethylthiazole ethiodide gives 3-ethyl-4-methyl-2'-phenylthiazolo-2,1,3-triazolocarbocyanine iodide, 2-methylbenzoxazole ethiodide gives 3-ethyl-2'-phenyloxa-2,1,3-triazolocarbocyanine iodide, etc.

The dyes of our invention are readily bleached by the usual photographic developers, e. g. Eastman Kodak Company's "D-76." The dyes are useful in the preparation of filter layers for photographic elements. The dyes are practically devoid of photographic action, such as sensitization or desensitization.

The alkyl quaternary salts represented by Formula II above can be prepared in known manner by heating the corresponding heterocyclic bases with the appropriate alkyl salt, e. g. methyl iodide, ethyl iodide, n-propyl bromide, n-butyl chloride, methyl p-toluenesulfonate, ethyl p-toluenesulfonate, ethyl benzenesulfonate, diethyl sulfate, dimethyl sulfate, etc., using a closed tube for the heating where higher temperatures are desired or volatility of the reactants demands. The quaternary iodides and bromides can be converted to the more soluble quaternary chlorides, e. g. by reacting the quaternary bromide or iodide with silver chloride, in boiling methyl alcohol, or in a phenol as described in United States Patent 2,245,249, dated June 10, 1941. Similarly the quaternary bromides can be converted to quaternary acetates by heating with silver acetate in methyl alcohol. Quaternary perchlorates can be formed by treating an ethyl alcoholic solution of the quaternary bromide or iodide with a hot aqueous solution of sodium perchlorate.

The aryl quaternary salts represented by Formula II above cannot be prepared in a manner analogous to that used to make the alkyl quaternary salts. 2-methylbenzothiazole phenohalides are described in United States Patent 2,317,357, dated April 27, 1943 and 2,330,203, dated September 28, 1943. 2-methyl-3-phenyl-thiazolinium bromide can be prepared by heating thioacetanilide and ethylene dibromide together at 115 to 120° C. (See the copending application of L. G. S. Brooker, Serial No. 622,677, filed October 16, 1945), now United States Patent 2,441,558, dated May 18, 1948. 2-methyl-3-(α-naphthyl)thiazolinium bromide can be prepared by heating thioacetyl-α-naphthylamine with ethylene dibromide. (See Brooker application Serial No. 622,677, supra).

The heterocyclic bases themselves, from which the alkyl quaternary salts can be prepared, are known for the most part. Several of the 2-methylbenzothiazole bases can be prepared by the method of Fries et al., Ann. 407, 208 (1915) in which the appropriate thioacetylaniline is oxidized with alkaline potassium ferricyanide. Thus p-chlorothioacetanilide gives 6-chloro-2-methylbenzothiazole. The thioacetylanilines can be prepared by treating the corresponding acetylaniline with phosphorus pentasulfide in dry benzene or xylenes. The acetylanilines can be prepared by the action of acetic anhydride or acetyl chloride on the corresponding aniline compound. Several of the 2-methylbenzothiazole bases can also be prepared by reducing bis(o-nitrophenyl)-disulfides with zinc dust and acetic acid, acetylating the reduction mixture with acetic anhydride and closing the ring by heating the resulting mixture. The bis(o-nitrophenyl)disulfides can be prepared from the corresponding o-bromonitrobenzenes by heating the o-bromonitrobenzene with sodium disulfide in methyl alcohol. Thus 2-bromo-5-chloronitrobenzene gives bis(4-chloro-2-nitrophenyl)disulfide which, on reduction, acetylation of the reduction product and heating gives 2-methyl-6-chlorobenzothiazole. 2-methyl-5-phenylbenzothiazole can be prepared by reducing bis(3-nitro-4-biphenyl)sulfide with zinc and acetic acid and acetylating the reduction product. (See the copending application of Gertrude Van Zandt and L. G. Brooker, Serial No. 711,816, filed November 22, 1946.) 2-methyl-4-phenylbenzothiazole can be prepared by oxidizing o-thioacetamidobiphenyl with an alkali metal ferricyanide. (See the copending application of Gertrude Van Zandt and L. G. S. Brooker, Serial No. 709,144, filed November 13, 1946, now U. S. Patent 2,485,679, dated October 25, 1949.) 2-methylbenzoxazoles can be prepared by treating the appropriate o-aminophenol with an excess of acetic anhydride, distilling off the acetic acid generated in the reaction as it is formed. Thus o-aminophenol and acetic anhydride give 2-methylbenzoxazole. 2-methylbenzoselenazole bases can be prepared by reducing bis(o-nitrophenyl)-diselenides with zinc dust and acetic acid, acetylating the reaction mixture with acetyl anhydride, and closing the ring by heating the resulting mixture. The bis(o-nitrophenyl) diselenides can be prepared from the corresponding o-bromonitrobenzenes by heating the o-bromonitrobenzene with sodium diselanide in methyl alcohol. See also Clark, J. Chem. Soc. (London) 1928, 2313.

The composition of Eastman Kodak Company's "D-76" developer is as follows:

| | | |
|---|---|---|
| Water, about 125° F. (50° C.) | cc | 750 |
| Elon (N-methyl-p-aminophenol sufate) | grams | 2.0 |
| Kodak sodium sulfite, desiccated | do | 100.0 |
| Kodak hydroquinone | do | 5.0 |
| Kodak borax, granular | do | 2.0 |
| Water to make | liter | 1.0 |

What we claim as our invention and desire to be secured by Letters Patent of the United States is:

1. A polymethine dye selected from the group consisting of those represented by the following two general formulas:

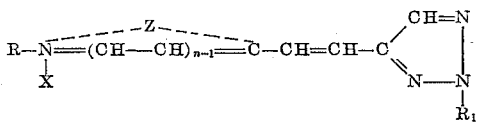

and

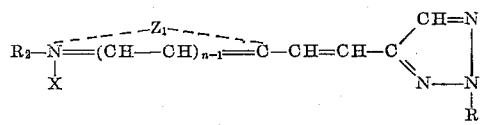

wherein R represents a member selected from the group consisting of an alkyl group of the formula $C_dH_{d+1}$ wherein $d$ represents a positive integer of from 1 to 4 and a monocyclic aryl group of the benzene series, $R_2$ represents a monocyclic aryl group of the benzene series, $n$ represents a positive integer of from 1 to 2, X represents an anion, Z represents the non-metallic atoms necessary to complete a heterocyclic nucleus selected from the group consisting of those of the oxazole series, those of the benzoxazole series, those of the naphthoxazole series, those of the thiazole series, those of the benzothiazole series, those of the naphthothiazole series, those of the selenazole series, those of the benzoselenazole series, those of the naphthoselenazole series, those of the thiazoline series, those of the indolenine series, those of the quinoline series, those of the isoquinoline series, and those of the pyridine series, and $Z_1$ represents the non-metallic atoms necessary to complete a heterocyclic nucleus selected from the group consisting of those of the benzothiazole series, those of the thiazoline series, and those of the 3,3-dimethylindolenine series.

2. A polymethine dye selected from those represented by the following general formula:

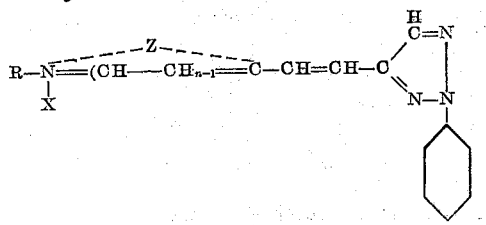

wherein R represents a primary alkyl group represented by the following general formula: $C_dH_{2d+1}$ wherein $d$ represents a positive integer of from 1 to 4, $n$ represents a positive integer of from 1 to 2, X represents an anion and Z represents the non-metallic atoms necessary to complete a heterocyclic nucleus containing 5 to 6 atoms in the heterocyclic ring.

3. A polymethine dye selected from those represented by the following general formula:

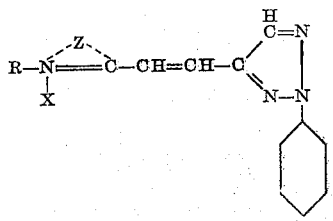

wherein R represents a primary alkyl group represented by the following general formula: $C_dH_{2d+1}$ wherein $d$ represents a positive integer of from 1 to 4, X represents an anion, and Z represents the non-metallic atoms necessary to complete nucleus of the quinoline series.

4. A polymethine dye selected from those represented by the following general formula:

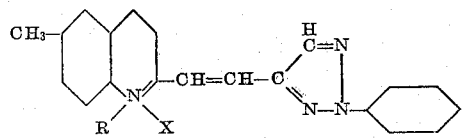

wherein R represents a primary alkyl group of the formula $C_dH_{2d+1}$ wherein $d$ represents a positive integer of from 1 to 4 and X represents a halide anion having an atomic weight from that of the chloride anion to that of the iodide anion.

5. The polymethine dye which is represented by the following formula:

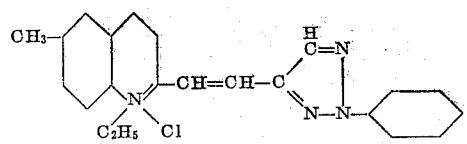

6. A polymethine dye selected from those which are represented by the following general formula:

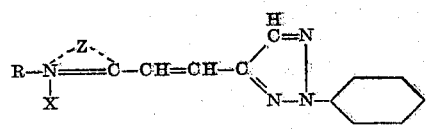

wherein R represents a primary alkyl group represented by the following general formula: $C_dH_{2d+1}$ where $d$ represents a positive integer of from 1 to 4, X represents an anion and Z represents the non-metallic atoms necessary to complete a heterocyclic nucleus of the benzothiazole series.

7. A polymethine dye selected from those which are represented by the following general formula:

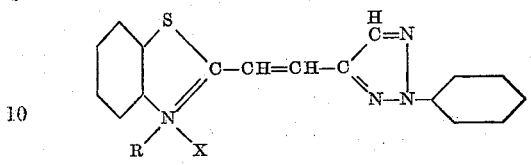

wherein R represents a primary alkyl group which is represented by the following general formula $C_dH_{2d+1}$ wherein $d$ represents a positive integer of from 1 to 4, and X represents a halide anion having an atomic weight from that of the chloride anion to that of the iodide anion.

8. The polymethine dye which is represented by the following formula:

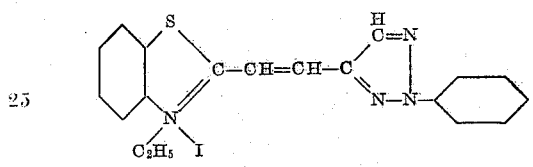

9. The polymethine dyes which are represented by the following general formula:

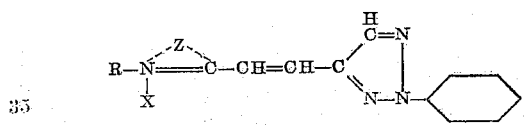

wherein R represents a primary alkyl group represented by the general formula: $C_dH_{2d+1}$ wherein $d$ represents a positive integer of from 1 to 4, X represents an anion and Z represents the non-metallic atoms necessary to complete a heterocyclic nucleus of the 3,3-dimethylindolenine series.

10. The polymethine dyes which are represented by the following general formula:

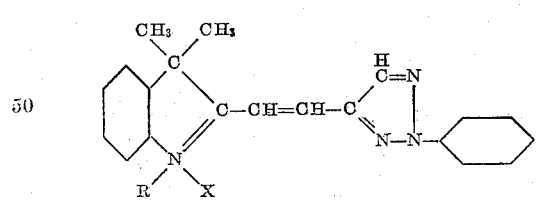

wherein R represents a primary alkyl group represented by the following general formula $C_dH_{2d+1}$ wherein $d$ represents a positive integer of from 1 to 4 and X represents a halide anion having an atomic weight from that of the chloride anion to that of the iodide anion.

11. The polymethine dye which is represented by the following formula:

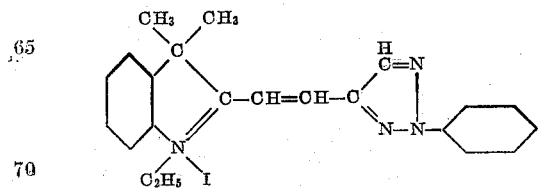

12. A process for preparing a polymethine dye comprising condensing, in the presence of a water-binding agent, a 4-formyl-2-aryl-2,1,3-triazole with a cyclammonium quaternary salt selected from the group consisting of those represented by the following two general formulas:

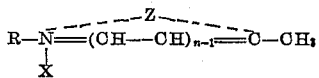

and

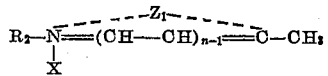

wherein R represents a member selected from the group consisting of an alkyl group of the formula $C_dH_{d+1}$ wherein $d$ represents a positive integer of from 1 to 4 and a monocyclic aryl group of the benzene series, $R_2$ represents a monocyclic aryl group of the benzene series, $n$ represents a positive integer of from 1 to 2, X represents an anion, Z represents the non-metallic atoms necessary to complete a heterocyclic nucleus selected from the group consisting of those of the oxazole series, those of the benzoxazole series, those of the naphthoxazole series, those of the thiazole series, those of the benzothiazole series, those of the naphthothiazole series, those of the selenazole series, those of the benzoselenazole series, those of the naphthoselenazole series, those of the thiazoline series, those of the indolenine series, those of the quinoline series, those of the isoquinoline series, and those of the pyridine series, and $Z_1$ represents the non-metallic atoms necessary to complete a heterocyclic nucleus selected from the group consisting of those of the benzothiazole series, those of the thiazoline series, and those of the 3,3-dimethylindolenine series.

13. A process for preparing a polymethine dye comprising condensing, in the presence of a carboxylic anhydride containing from 4 to 8 carbon atoms, 4-formyl-2-phenyl-2,1,3-triazole with a cyclammonium quaternary salt selected from those represented by the following general formula:

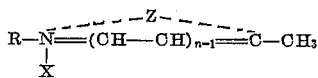

wherein R represents a primary alkyl group represented by the following general formula: $C_dH_{2d+1}$ wherein $d$ represents a positive integer of from 1 to 4, $n$ represents a positive integer of from 1 to 2, X represents an anion, and Z represents the non-metallic atoms necessary to complete a heterocyclic nucleus containing from 5 to 6 atoms in the heterocyclic ring.

14. A process for preparing a polymethine dye comprising condensing, in the presence of acetic anhydride, 4-formyl-2-phenyl-2,1,3-triazole with a quinoline quaternary salt selected from those represented by the following general formula:

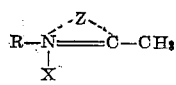

wherein R represents a primary alkyl group represented by the following general formula: $C_dH_{2d+1}$ wherein $d$ represents a positive integer of from 1 to 4, X represents an anion, and Z represents the non-metallic atoms necessary to complete a heterocyclic nucleus of the quinoline series.

15. A process for preparing a polymethine dye comprising condensing, in the presence of acetic anhydride, 4-formyl-2-phenyl-2,1,3-triazole with a quinoline quaternary salt selected from those represented by the following general formula:

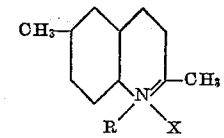

wherein R represents a primary alkyl group represented by the following general formula: $C_dH_{2d+1}$ wherein $d$ represents a positive integer of from 1 to 4 and X represents a halide anion having an atomic weight from that of the chloride anion to that of the iodide anion.

16. A process for preparing a polymethine dye comprising condensing, in the presence of acetic anhydride, 4-formyl-2-phenyl-2,1,3-triazole with a cyclammonium quaternary salt selected from those represented by the following general formula:

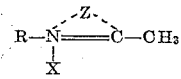

wherein R represents a primary alkyl group represented by the following general formula: $C_dH_{2d+1}$ wherein $d$ represents a positive integer from 1 to 4, X represents an anion and Z represents the non-metallic atoms necessary to complete a nucleus of the benzothiazole series.

17. A process for preparing a polymethine dye comprising condensing, in the presence of acetic anhydride, 4-formyl-2-phenyl-2,1,3-triazole with a cyclammonium quaternary salt selected from those represented by the following general formula:

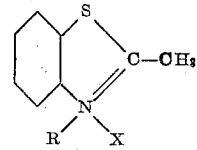

wherein R represents a primary alkyl group represented by the following general formula: $C_dH_{2d+1}$ wherein $d$ represents a positive integer of from 1 to 4, and X represents a halide anion having an atomic weight between that of the chloride anion and that of the iodide anion.

18. A process for preparing a polymethine dye comprising condensing, in the presence of acetic anhydride, 4-formyl-2-phenyl-2,1,3-triazole with a cyclammonium quaternary salt selected from those represented by the following general formula:

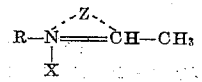

wherein R represents a primary alkyl group represented by the following general formula: $C_dH_{2d+1}$ wherein $d$ represents a positive integer of from 1 to 4, X represents an anion and Z represents the non-metallic atoms necessary to complete a heterocyclic nucleus of the 3,3-dimethylindolenine series.

19. A process for preparing a polymethine dye comprising condensing, in the presence of acetic anhydride, 4-formyl-2-phenyl-2,1,3-triazole with a cyclammonium quaternary salt selected from those represented by the following general formula:

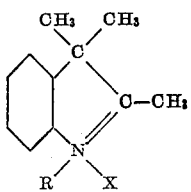

wherein R represents a primary alkyl group represented by the following general formula: $C_dH_{2d+1}$ wherein $d$ represents a positive integer of from 1 to 4, and X represents a halide anion having an atomic weight from that of the chloride anion to that of the iodide anion.

LESLIE G. S. BROOKER.
ROBERT H. SPRAGUE.

REFERENCES CITED

The following references are of record in the file of this patent:

UNITED STATES PATENTS

| Number | Name | Date |
|---|---|---|
| 2,439,210 | Heimbach | Apr. 6, 1948 |